April 21, 1936.   I. SAKS   2,037,928

CLUTCH PLATE

Filed Sept. 8, 1932

INVENTOR.
Ira Saks
BY
Fay Oberlin & Fay
ATTORNEYS.

Patented Apr. 21, 1936

2,037,928

UNITED STATES PATENT OFFICE 2,037,928

CLUTCH PLATE

Ira Saks, Cleveland, Ohio

Application September 8, 1932, Serial No. 632,169

3 Claims. (Cl. 192—107)

The present invention, relating as indicated to an improvement in clutch plates, has more particular reference to the provision of a novel form of construction for a torque-transmitting member commonly termed "a cushion plate" adapted to be best used in conjunction with the internal combustion engine. Heretofore it has been contemplated to design an automobile clutch plate in such form whereby a certain amount of cushioning or yielding effect could be imparted to that portion of the disc which is subjected to the compressive force inducing frictional engagement between the engine fly wheel and the clutch pressure plate. The purpose of such a cushioning effect was to produce a more even and uniform torque-transmitting engagement of the clutch parts. Inasmuch as the clutch plate is made in the form of a disc rotating about its axis, it is apparent that there exists a differential velocity between the inner and outer diameters of the facing ring. Due to the fact that there must necessarily be a certain amount of slippage in such a frictional engagement member, it is obvious that those contacting areas which are revolving at the highest linear speed will be subjected to the greatest wear, resulting in a tendency for the friction facing linings of a clutch plate to thin out or taper toward their outer diameter. Accordingly, it is one of the objects of the present invention to counteract and eliminate such a wearing action. It is a further object to provide a clutch plate wherein the frictional contacting area will increase directly proportionately to the amount of torque transmitted during engagement. Yet another object of the invention is to combine a lateral resilient cushioning action together with the last mentioned proportionately increasing surface contacting action. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one various mechanical forms in which the principle of the invention may be used.

Figure 1:
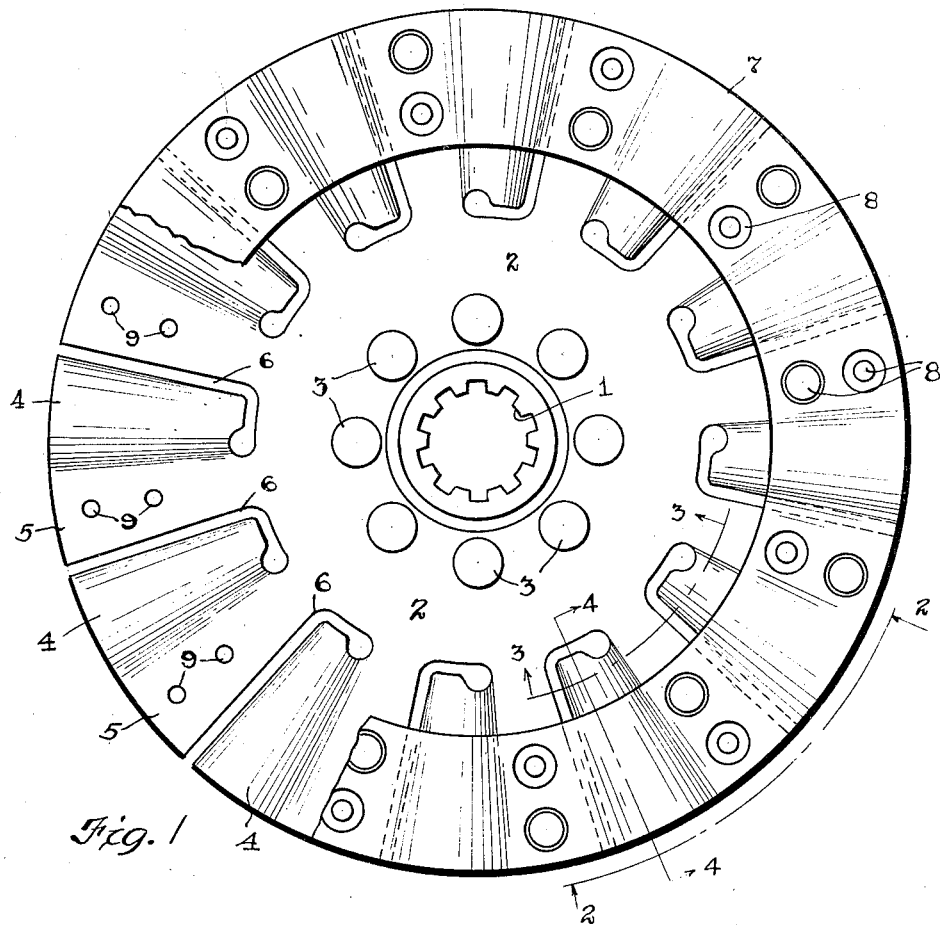
Figure 2:
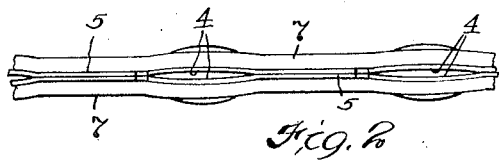
Figure 3:
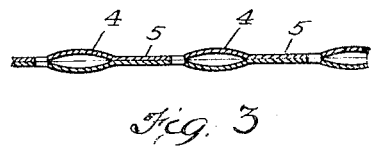

In said annexed drawing:

Fig. 1 is a plan view of a clutch plate embodying the principles of my invention with a portion of the friction facing ring cut away; Fig. 2 is a developed elevational view taken along the arcuate line 2—2 of Fig. 1; Fig. 3 is a section taken along the arcuate line 3—3 of Fig. 1; and Fig. 4 is a section taken along the radial line 4—4 of Fig. 1.

Now referring more particularly to the drawing, the clutch plate which I have therein illustrated consists of the splined hub 1 to which the pair of clutch plates 2—2 are secured by any suitable means such as the rivets 3. It is to be herein noted that my invention may consist of a single disc 2 without violating the spirit of the invention. However, the embodiment thereof in its preferred form consists of double discs as illustrated. The outer peripheral portions of the discs 2—2 are composed of a plurality of alternate arcuately bowed or offset sectors 4 and the flat sectors 5. The sectors 4 are isolated from the body of the disc 2 along one radial side and their inner circumferential boundary by the L-shaped slots 6. It is to be noted that the inner legs of the L slots 6 are all directed in the same direction. This direction is directly opposite to that of the direction of rotation of the disc, in order that when the clutch plate is subjected to the torque-transmitting engagement, a wiping action will occur through the alternate flat and offset sectors. In this manner when the offset sectors 4 are subjected to the compressive engaging forces, they will tend to flatten out in conformity in direction of rotation and will not be forced into a more severely bowed form as would be the case if the sectors were otherwise disposed.

A pair of friction facing rings 7 which are composed of material of high friction and heat-resisting properties are secured to the lateral faces of the discs 2—2 by means of rivets 8 passing through the holes 9 in the flat sectors 5.

Figure 4:
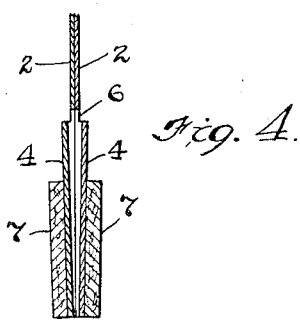

Now directing attention to Figs. 2 and 4 most particularly, it will be seen that the curved or offset sectors 4 are angularly inclined in a radial direction from the plane of the discs toward their outer edges, so that the inner portions of the friction facing rings will extend laterally from the plane of the plate a greater distance than the outer portions of the facing rings. The result of this latter described construction is that the inner portions of the facing ring 7 which, incidentally, are the slowest in velocity, will initially contact when the clutch plate is forced into engagement. It will be noted that the curved and angularly inclined sectors 4 are virtually in the form of a sector of a cone.

By virtue of the above described clutch plate construction, it will be seen that I have provided a clutch member which possesses the advantageous properties of a lateral cushioning effect as well as the effect of proportionately increasing the frictional engagement area in relation to the amount of torque-transmitted. The results of such a construction are that there will be a more even and uniform engagement of the clutch parts eliminating chattering and grabbing, and that the clutch plate will possess a greater durability and will more readily withstand the attacks of the forces of wear and deterioration.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch plate, the combination of a pair of discs secured together at their central portions, a plurality of laterally offset and radially inclined sectors positioned in the outer portions of said discs, and friction facing rings secured to said discs, the inner edge of said sectors being furthest removed from the plane of said discs and extending beyond the inner periphery of said facing rings.

2. In a clutch plate, the combination of a pair of discs having their body portions contacting each other and being secured together at their central portions, a plurality of laterally offset sectors and alternately disposed flat sectors disposed in the outer peripheral portions of said discs, said offset sectors being angularly inclined in a radial direction from the plane of said discs and converging toward their outer edges, the inclinations of the individual sectors in each respective disc being in the same direction, and opposite to that of the sectors in the other disc.

3. In a clutch plate, the combination of a pair of discs having their body portions contacting each other and being secured together at their central portions, a plurality of flat sectors disposed in the outer peripheral portions of said discs, and a plurality of laterally offset and radially inclined sectors alternately disposed between said flat sectors, said radially inclined sectors converging toward the outer edge of said discs, and the inner edge of said radially inclined sectors being separated from the body of said discs and furthest removed from the plane of said discs, the inclinations of the individual sectors in each respective disc being in the same direction, and opposite to that of the sectors in the other disc.

IRA SAKS.